(12) United States Patent       (10) Patent No.:     US 8,281,783 B2
Bennett                         (45) Date of Patent:        Oct. 9, 2012

(54) THERMAL ABSORBER WITH GRAVITY COUNTERFLOW REGENERATION FOR SOLAR AMTEC POWER SYSTEMS

(75) Inventor: Mark D. Bennett, Benld, IL (US)

(73) Assignee: The Boeing Company, Chicago, IL (US)

( * ) Notice: Subject to any disclaimer, the term of this patent is extended or adjusted under 35 U.S.C. 154(b) by 483 days.

(21) Appl. No.: 12/537,346

(22) Filed: Aug. 7, 2009

(65) Prior Publication Data

US 2011/0030677 A1    Feb. 10, 2011

(51) Int. Cl.
*F24J 2/44*    (2006.01)
*F24J 2/04*    (2006.01)
*H01L 35/00*   (2006.01)

(52) U.S. Cl. ........ 126/638; 126/640; 126/646; 126/679; 136/200; 136/206

(58) Field of Classification Search .................. 126/638, 126/640, 646, 679; 136/200, 206
See application file for complete search history.

(56) References Cited

U.S. PATENT DOCUMENTS

| | | | |
|---|---|---|---|
| 4,148,300 A | 4/1979 | Kaufman, Sr. | |
| 4,188,941 A | 2/1980 | Hopkins | |
| 4,292,579 A * | 9/1981 | Constant | 322/2 R |
| 4,459,970 A | 7/1984 | Clee | |
| 4,510,210 A | 4/1985 | Hunt | |
| 4,835,071 A | 5/1989 | Williams et al. | |
| 4,857,421 A | 8/1989 | Ernst | |
| 5,085,948 A | 2/1992 | Tsukamoto et al. | |
| 5,143,051 A | 9/1992 | Bennett | |
| 6,313,391 B1 | 11/2001 | Abbott | |
| 6,656,238 B1 | 12/2003 | Rogers et al. | |
| 7,431,570 B2 * | 10/2008 | Young et al. | 417/208 |
| 2005/0223632 A1 | 10/2005 | Matviya et al. | |
| 2006/0086118 A1 | 4/2006 | Venkatasubramanian et al. | |
| 2006/0231133 A1 | 10/2006 | Fork et al. | |
| 2006/0243317 A1 | 11/2006 | Venkatasubramanian | |
| 2008/0000516 A1 | 1/2008 | Shifman | |

FOREIGN PATENT DOCUMENTS

| | | |
|---|---|---|
| DE | 4028403 | 3/1992 |
| DE | 4028404 | 3/1992 |
| DE | 4028406 | 3/1992 |
| DE | 10033157 | 1/2002 |

OTHER PUBLICATIONS

PCT, International Search Report and Written Opinion, International Application No. PCT/US2010/044069 (Mar. 7, 2011).

(Continued)

*Primary Examiner* — Kenneth Rinehart
*Assistant Examiner* — William Corboy
(74) *Attorney, Agent, or Firm* — John A. Lepore

(57) ABSTRACT

A thermal absorber including a light-transparent reservoir having an alkali metal received therein, a housing sealingly coupled to the reservoir to define an enclosed volume, the housing including a thermal barrier wall that divides the volume into a cold chamber and a hot chamber, the cold chamber including a sump having a drain hole in fluid communication with the hot chamber, and at least one AMTEC cell supported by the cell supporting surface, the AMTEC cell extending through the cold chamber and the hot chamber.

18 Claims, 3 Drawing Sheets

OTHER PUBLICATIONS

Schock, A. et al., "Design, Analyses, and Fabrication Procedure of AMTEC Cell, Test Assembly, and Radioisotope Power System for Outer-Planet Missions," *Acta Astronautica*, vol. 50, No. 8, pp. 471-510.

Sievers, R.K. et al., "Alkali Metal Thermal to Electric Conversion," *Mechanical Engineering* (11 pages) (1995).

PCT, International Search Report and Written Opinion, International Application No. PCT/US2010/044140 (Dec. 7, 2010).

Product literature, "Product Data Sheet: CFOAM® Carbon Foams," by Touchstone Research Laboratory, Triadelphia, West Virginia (2 pages).

"CFOAM® Product Overview," web page by Touchstone Research Laboratory, Ltd., http://www.cfoam.com/whatis.htm (2 pages).

"CFOAM® Carbon Foam Insulation Applications," web page by Touchstone Research Laboratory, Ltd., http://www.cfoam.com/insulation.htm (1 page).

Buschle, J. et al. (2006) Latent Heat Storage Process Heat Applications, ECOSTOCK 2006, Stockton New Jersey, 31.5-2.6.2006.

Insaco, Alumina Properties, Mar. 2, 2006, http://www.azom.com/article.aspx?ArticleID=3269, 1-2.

Bossman, DE4028406, Mar. 12, 1992, machine translation, 1-8.

\* cited by examiner

US 8,281,783 B2

THERMAL ABSORBER WITH GRAVITY COUNTERFLOW REGENERATION FOR SOLAR AMTEC POWER SYSTEMS

FIELD

The present patent application relates to concentrating solar power systems and, more particularly, to solar alkali metal thermal-to-electric converter ("AMTEC") power systems and, still more particularly, to thermal absorbers for solar AMTEC power systems.

BACKGROUND

Concentrating solar power systems employ optical elements, such as mirrors and lenses, to focus a large area of incoming sunlight into a concentrated location. For example, parabolic trough concentrating solar power systems employ elongated parabolic mirrors that focus incoming sunlight on elongated receivers supported over the mirrors. The entire parabolic trough assembly may be supported on a tracker that maintains precise alignment of the mirrors with the sun as the sun moves across the sky.

AMTEC power systems are configured to take advantage of temperature gradients across an AMTEC cell to convert thermal energy directly into electrical energy. A typical AMTEC cell includes a beta-alumina solid electrolyte ("BASE"), which is an electronic insulator and an ionic conductor. In an AMTEC power system, the AMTEC cell defines a barrier between a hot side and a cold side and the opposing sides of the cell are electrically coupled through an external load circuit. When an alkali metal, such as sodium, is heated on the hot side of the cell, the sodium metal gives up electrons which pass through the load circuit while corresponding sodium ions pass through the electrolyte to the cold side of the system, thereby driving an electric current. At the cold side, sodium ions are neutralized by the electrons returning from the load circuit to yield condensed sodium metal, which may then be recycled to the hot side of the system.

Solar AMTEC power systems utilize concentrating solar power optical systems to generate the required temperature gradient across the AMTEC cell that drives the electric current. However, existing solar AMTEC power systems employ complex mechanisms, such as pumps and wicks, for regenerating the condensed alkali metal. Such regeneration mechanisms increase the overall cost of such systems and, if they contain moving parts, substantially increase the likelihood of failure.

Accordingly, those skilled in the art continue to seek advances in the field of solar AMTEC power systems.

SUMMARY

In one aspect, the disclosed thermal absorber may include a light-transparent reservoir having an alkali metal received therein, a housing sealingly coupled to the reservoir to define an enclosed volume, the housing including a thermal barrier wall that divides the volume into a cold chamber and a hot chamber, the cold chamber including a sump having a drain hole in fluid communication with the hot chamber, and at least one alkali metal thermal-to-electric converter cell supported by the cell supporting surface, the alkali metal thermal-to-electric converter cell extending through the cold chamber and the hot chamber.

In another aspect, the disclosed thermal absorber may include a reservoir being at least partially transparent to solar energy, an alkali metal received in the reservoir, a housing sealingly coupled to the reservoir to define a volume, the housing including a thermal barrier wall that divides the volume into at least a cold chamber and a hot chamber, the thermal barrier wall further defining a cell supporting surface and a sump in the cold chamber, the sump including a drain hole that is in fluid communication with the hot chamber, and at least one alkali metal thermal-to-electric converter cell supported by the cell supporting surface, the alkali metal thermal-to-electric converter cell extending through the cold chamber and the hot chamber.

Other aspects of the disclosed thermal absorber and associated concentrating solar power systems will become apparent from the following description, the accompanying drawings and the appended claims.

DETAILED DESCRIPTION

Figure 1:
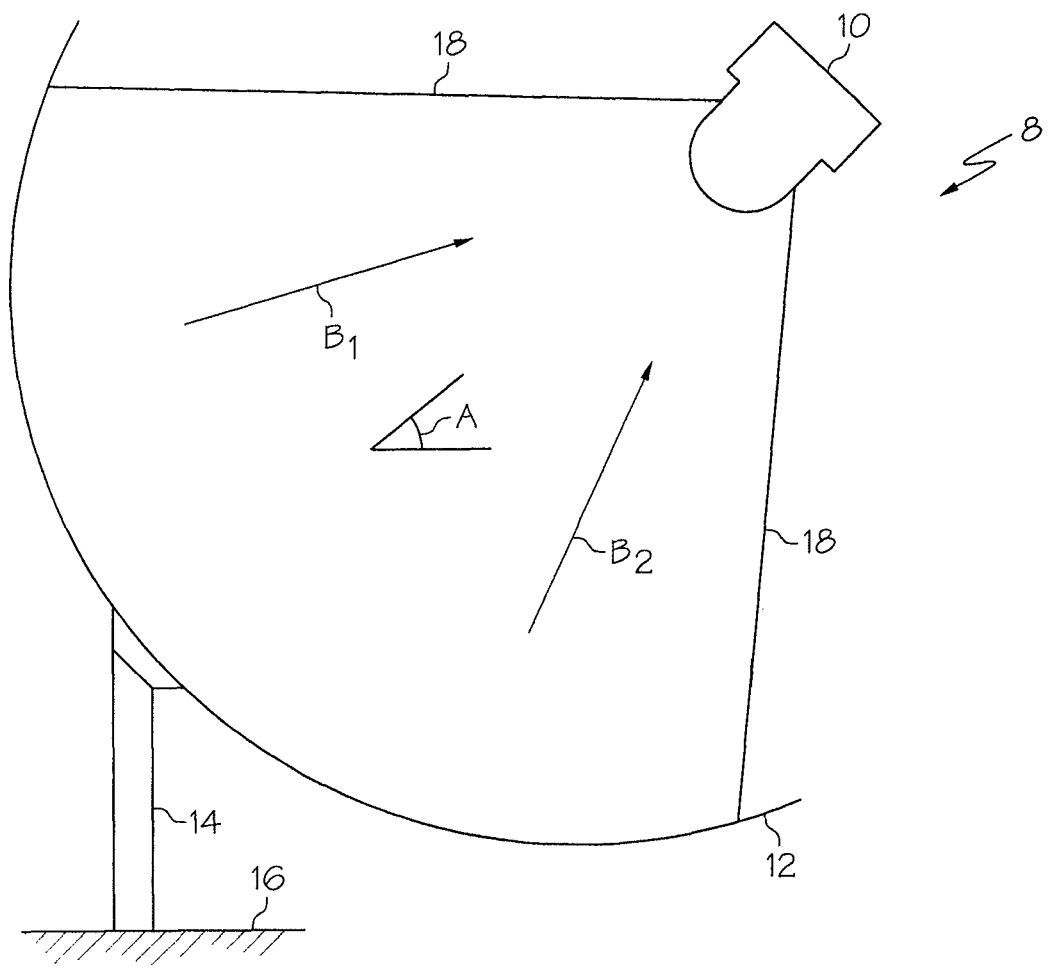
FIG. 1 is a schematic side elevational view of a concentrating solar power system having a thermal absorber configured in accordance with an aspect of the present disclosure.

As shown in FIG. 1, one aspect of a solar AMTEC power system, generally designated 8, may include a thermal absorber 10, an optical element 12, a first support structure 14 for supporting the optical element 12 relative to a sub-structure 16, and a second support structure 18 for supporting the thermal absorber 10 relative to the optical element 12. The optical element 12 and associated thermal absorber 10 may be disposed at an angle A relative to the sub-structure 16, and may direct incoming solar energy to the thermal absorber 10, as shown by arrows $B_1$, $B_2$. Optionally, the first support structure 14 may be a tracker (not shown) configured to maintain alignment between the optical element 12 and the solar energy source (not shown).

As shown in FIG. 1, the optical element 12 may be a parabolic mirror of a parabolic trough. However, those skilled in the art will appreciate that various concentrating solar power systems may be configured to use the disclosed thermal absorber 10 without departing from the scope of the present disclosure, including, for example, multiple or segmented mirrors, Fresnel mirrors, and lenses.

Figure 2:
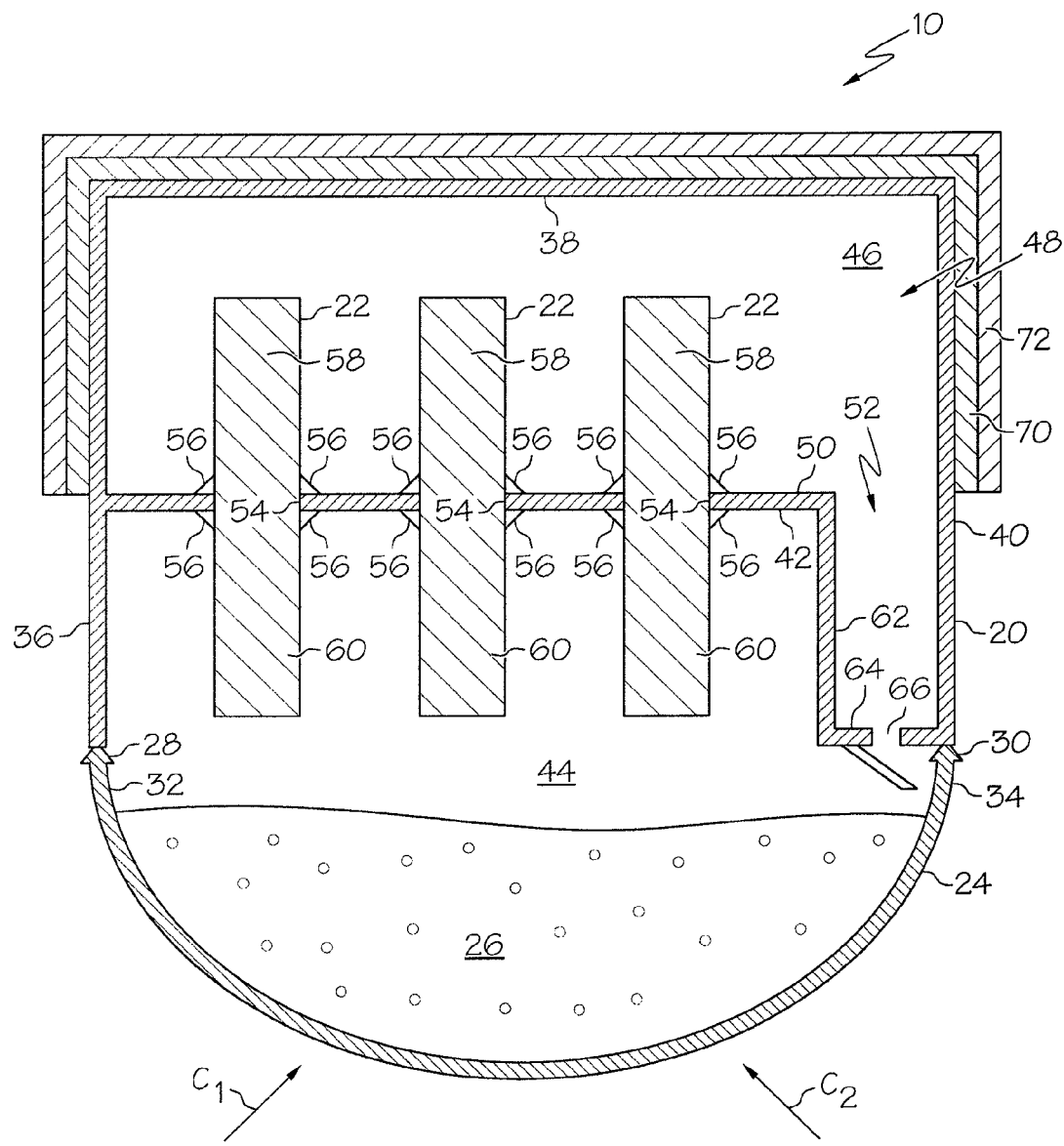
FIG. 2 is a schematic cross-sectional view of the thermal absorber shown in FIG. 1.

Referring to FIG. 2, the disclosed thermal absorber 10 may include a housing 20, one or more AMTEC cells 22 and a reservoir 24 containing an alkali metal 26. The AMTEC cells 22 may be any AMTEC cells known in the art, and may include an anode (not shown), a cathode (not shown) and an electrolyte (not shown), such as a beta-alumina solid electrolyte. For example, the AMTEC cells may be hollow-rod type AMTEC cells.

The reservoir 24 may be sealingly coupled to the housing 20 to define an enclosed volume 48 within the thermal absorber 10. For example, the housing 20 may include U-shaped brackets 28, 30 into which the ends 32,-34 of the reservoir 24 may be received. Gaskets (not shown) or a sealant (not shown) may be used to ensure a vapor tight seal between the housing 20 and the reservoir 24.

Figure 3:
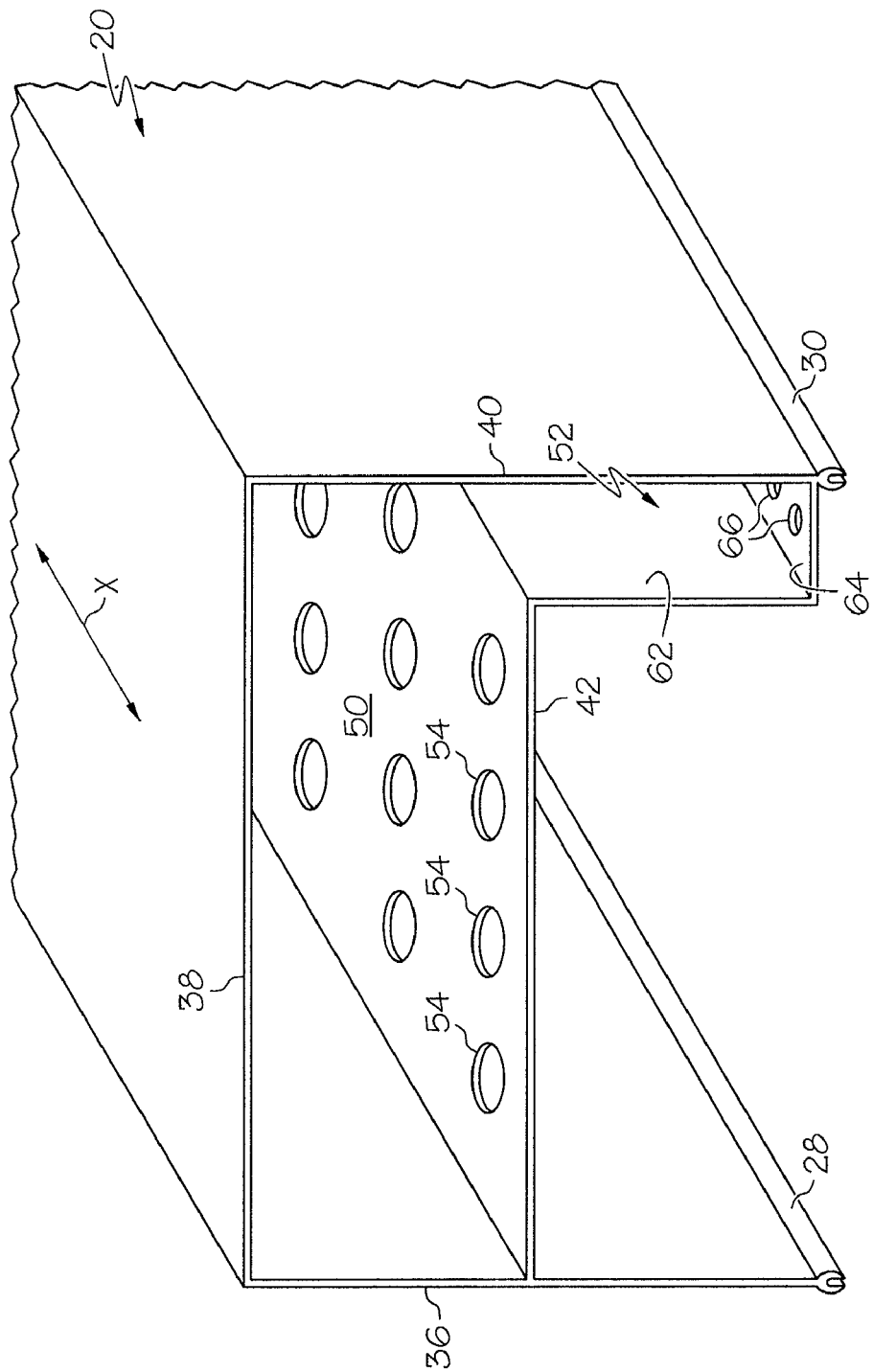
FIG. 3 is a side perspective view of the housing of the thermal absorber of FIG. 2.

As shown in FIG. 3, the housing 20 may be elongated along an axis X, as is known in the art. Correspondingly, the reservoir 24 may be elongated along the axis X to define a trough that supports the alkali metal 26. Therefore, in one aspect, the thermal absorber 10 may be configured as an elongated tubelike absorber. However, those skilled in the art will appreciate that the thermal absorber 10 may be configured in various geometries to accommodate various concentrating solar power systems. For example, the thermal absorber 10 may be configured as a discrete, single point receiver with a dome-shaped reservoir 24 for use with a parabolic dish mirror.

The reservoir 24 may be formed from any material that is at least partially transparent to solar energy such that incoming solar energy (arrows $C_1$, $C_2$) penetrates the reservoir 24 and heats the alkali metal 26 supported in the reservoir 24. In one particular aspect, the reservoir 24 may be formed from a material having high light transmittance and low light reflectance. For example, the reservoir 24 may be constructed from glass, such as low-iron glass, or optically clear (or at least partially clear) ceramic. The wall thickness of the reservoir 24 may be selected to optimize solar energy collection/retention as well as mechanical strength, which may depend on the environment in which the thermal absorber 10 will be deployed.

The shape of the reservoir 24 may be dictated by the type of concentrating solar power system being used and may be configured to maximize the collection and retention of incoming solar energy. For example, as shown in FIG. 2, the reservoir 24 may be dome-shaped in cross-section.

The alkali metal 26 may substantially fill the reservoir 24, as is known in the art. While sodium metal is currently most commonly used, those skilled in the art will appreciate that other alkali metals, such as lithium, potassium and rubidium, may also be used. Furthermore, those skilled in the art will appreciate that the alkali metal 26 may be substituted with other materials capable of providing the same function in the thermal absorber 10 without departing from the scope of the present disclosure.

Referring now to FIGS. 2 and 3, the housing 20 may include a first side wall 36, a top wall 38 and a second side wall 40. Additionally, the housing 20 may include a thermal barrier wall 42 which may divide the enclosed volume 48 of the thermal absorber 10 into a hot chamber 44 and a cold chamber 46. The hot chamber 44 may be bounded by the first side wall 36, the reservoir 24 and the thermal barrier wall 42. Therefore, the hot chamber 44 may be in direct fluid communication with the alkali metal 26 such that the hot chamber 44 may receive alkali metal vapor when the alkali metal 26 in the reservoir is heated. The cold chamber 46 may be bounded by the first and second side walls 36, 40, the top wall 38 and the thermal barrier wall 42.

The housing 20 may be formed from a generally rigid material, such as aluminum, steel (e.g., stainless steel) or the like. Appropriate non-metal materials may also be used, such as plastic. For example, the housing 20 may be constructed from internally or structurally reinforced plastic. Those skilled in the art will appreciate that the housing 20 may be constructed using well known forming techniques, such as cutting and welding.

The thermal barrier wall 42 may extend from the first side wall 36 to the second side wall 40 and may define a cell supporting surface 50 and a sump 52. In one aspect, the sump 52 may be partially defined by the thermal barrier wall 42 and partially by the second side wall 40, as shown in FIGS. 2 and 3. In another aspect (not shown), the sump 52 may be entirely defined by the thermal barrier wall 42.

The cell supporting surface 50 of the thermal barrier wall 42 may include one or more holes 54 formed therein. The holes 54 may be sized and shaped to receive and support the AMTEC cells 22 therein, as shown in FIG. 2. The AMTEC cells 22 may extend through the holes 54 in the thermal barrier wall 42 such that a first portion 58 of each AMTEC cell 22 extends into the cold chamber 46 and a second portion 60 of each AMTEC cell 22 extends into the hot chamber 44. A thermal adhesive 56, such as a thermal adhesive available from Dow Corning Corporation of Midland, Mich., may be used to secure the AMTEC cells 22 in the holes 54 and to the thermal barrier wall 42.

The sump 52 may be positioned adjacent to the cell supporting surface 50 to act as a gravity drain that receives fluid that has condensed in the cold chamber 46 of the thermal absorber 10. In one aspect, as shown in FIG. 2, the cell supporting surface 50 may extend generally perpendicular to the first wall 36. Therefore, referring to FIG. 1, when the thermal absorber 10 is mounted at an angle to the sub-structure 16, gravity will direct condensed fluid from the cell supporting surface 50 to the sump 52. In another aspect, the cell supporting surface 50 itself may be angled towards the sump 52 such gravity directs condensed fluid to the sump 52. For example, the cell supporting surface 50 may be disposed at a non-right angle relative to the side wall 62 of the sump 52.

Referring to FIGS. 2 and 3, the base surface 64 of the sump 52 may include one or more drain holes 66 that provide fluid communication between the cold chamber 46 and the hot chamber 44, thereby allowing fluid collected in the sump 52 to return to the reservoir 26. Fluid flow between the sump 52 and the reservoir 26 may be driven by gravity. An optional directional barrier 68 or flap may direct fluid egress from the sump 52 to the reservoir 24 and may obstruct vapor ingress from the hot chamber 44 to the sump 52.

Accordingly, incoming solar energy (arrows $C_1$, $C_2$) may heat the alkali metal 26 in the reservoir 24 to form a vapor in the hot chamber 44. The hot vapor may interact with the AMTEC cells to generate electricity, as is well known in the art, resulting in condensed alkali metal in the cold chamber 46. The condensed alkali metal may flow, by gravity, to the sump 52, wherein the condensed alkali metal drains, by way of drain hole 66, back to the reservoir 24. Therefore, the disclosed thermal absorber 10 provides for gravity-driven counterflow regeneration of the alkali metal.

Condensation within the cold chamber 46 may be facilitated by radiating heat from the walls of the housing 20 surrounding the cold chamber 46. For example, as shown in FIG. 2, a first layer 70 of a highly thermally conductive material may be coupled to the housing 20 surrounding the cold chamber 46. Optionally, a second layer 72 of a highly thermally conductive material may be coupled to the first layer 70 of highly thermally conductive material. An exemplary first highly thermally conductive material is PTM 3180, which is available from Honeywell of Morris Township, N.J. An exemplary second highly thermally conductive material is POCO HTC, which is available from Poco Graphite, Inc. of Decatur, Tex.

Although various aspects of the disclosed thermal absorber have been shown and described, modifications may occur to those skilled in the art upon reading the specification. The present application includes such modifications and is limited only by the scope of the claims.

What is claimed is:

1. A thermal absorber comprising:
   a light-transparent reservoir having an alkali metal received therein;
   a housing sealingly coupled to said reservoir to define an enclosed volume, said housing including a thermal barrier wall that divides said volume into a cold chamber and a hot chamber, said thermal barrier wall including a sump in said cold chamber having a drain hole in fluid communication with said hot chamber;

at least one alkali metal thermal-to-electric converter ("AMTEC") cell supported by said thermal barrier wall, said AMTEC cell extending through said cold chamber and said hot chamber; and a support structure connected to orient said housing such that at least a portion of said cold chamber is at an elevation above at least a portion of said hot chamber, and said sump is positioned at a relatively lower elevation portion of said cold chamber such that said alkali metal condensing in said cold portion flows downwardly along said thermal barrier wall by gravity to collect in said sump, and flows from said sump through said drain hole by gravity to said hot chamber.

2. The thermal absorber of claim 1 wherein said reservoir is formed from at least one of a glass or a ceramic.

3. The thermal absorber of claim 1 wherein said reservoir is formed from low iron glass.

4. The thermal absorber of claim 1 wherein said alkali metal is sodium.

5. The thermal absorber of claim 1 wherein said thermal barrier wall extends between two side walls of said housing.

6. The thermal absorber of claim 1 wherein said thermal barrier wall defines a hole therein, and wherein said AMTEC cell extends through said hole.

7. The thermal absorber of claim 6 further comprising a thermal adhesive that secures said AMTEC cell to said thermal barrier wall.

8. The thermal absorber of claim 1 further comprising a highly thermally conductive material coupled to a portion of said housing surrounding said cold chamber.

9. The thermal absorber of claim 1 wherein said sump is disposed at a relatively lowest elevation portion of said cold portion.

10. A thermal absorber comprising:
a reservoir being at least partially transparent to solar energy;
an alkali metal received in said reservoir;
a housing sealingly coupled to said reservoir to define a volume, said housing including a thermal barrier wall that divides said volume into at least a cold chamber and a hot chamber, said thermal barrier wall further defining a cell supporting surface and a sump in said cold chamber, said sump including a drain hole in fluid communication with said hot chamber;

at least one alkali metal thermal-to-electric converter ("AMTEC") cell supported by said cell supporting surface, said AMTEC cell extending through said cold chamber and said hot chamber; and a support structure connected to orient said housing such that at least a portion of said cold chamber is at an elevation above at least a portion of said hot chamber, and said sump is positioned at a relatively lower elevation portion of said cold chamber such that said alkali metal condensing in said cold portion flows downwardly along said thermal barrier wall by gravity to collect in said sump, and flows from said sump through said drain hole by gravity to said hot chamber.

11. The thermal absorber of claim 10 wherein said sump is at a lower elevation relative to said cell supporting surface such that liquid collected in said cold chamber is directed by gravity to flow from said cell supporting surface downwardly to said sump.

12. The thermal absorber of claim 10 wherein said reservoir is formed from at least one of a glass or a ceramic.

13. The thermal absorber of claim 10 wherein said reservoir is formed from low iron glass.

14. The thermal absorber of claim 10 wherein said alkali metal is sodium.

15. The thermal absorber of claim 10 wherein said thermal barrier wall extends between two side walls of said housing.

16. The thermal absorber of claim 10 wherein said cell supporting surface defines a hole therein, and wherein said AMTEC cell extends through said hole.

17. The thermal absorber of claim 6 further comprising a thermal adhesive that secures said AMTEC cell to said cell supporting surface.

18. The thermal absorber of claim 1 further comprising a highly thermally conductive material coupled to a portion of said housing surrounding said cold chamber.

* * * * *